(12) United States Patent
Kim et al.

(10) Patent No.: US 9,136,936 B2
(45) Date of Patent: Sep. 15, 2015

(54) APPARATUS AND METHOD FOR PROVIDING FREQUENCY SELECTIVELY IN SATELLITE COMMUNICATION SYSTEM

(75) Inventors: Hee-Wook Kim, Daejeon-si (KR); Kun-Seok Kang, Daejeon-si (KR); Bon-Jun Ku, Daejeon-si (KR); Do-Seob Ahn, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 554 days.

(21) Appl. No.: 13/328,261

(22) Filed: Dec. 16, 2011

(65) Prior Publication Data

US 2012/0155378 A1    Jun. 21, 2012

(30) Foreign Application Priority Data

Dec. 21, 2010    (KR) .................. 10-2010-0131572

(51) Int. Cl.
| | |
|---|---|
| *H04W 84/06* | (2009.01) |
| *H04B 7/185* | (2006.01) |
| *H04L 5/00* | (2006.01) |
| *H01Q 25/00* | (2006.01) |
| *H04W 72/04* | (2009.01) |

(52) U.S. Cl.
CPC .......... *H04B 7/18515* (2013.01); *H01Q 25/00* (2013.01); *H04L 5/0023* (2013.01); *H04L 5/0037* (2013.01); *H04W 72/0453* (2013.01); *H04W 84/06* (2013.01)

(58) Field of Classification Search
None
See application file for complete search history.

(56) References Cited

U.S. PATENT DOCUMENTS

| | | | | |
|---|---|---|---|---|
| 5,649,287 | A  * | 7/1997  | Forssen et al. | 370/312 |
| 6,842,487 | B1 * | 1/2005  | Larsson | 375/260 |
| 8,335,159 | B2 * | 12/2012 | Khan et al. | 370/235 |
| 8,565,193 | B2 * | 10/2013 | Ylitalo | 370/334 |
| 2005/0281240 | A1 * | 12/2005 | Oh et al. | 370/343 |
| 2006/0239180 | A1 | 10/2006 | Khan et al. | |
| 2007/0082625 | A1 * | 4/2007  | Hwang et al. | 455/101 |
| 2007/0286105 | A1 * | 12/2007 | Kim et al. | 370/310.1 |
| 2008/0247364 | A1 * | 10/2008 | Kim et al. | 370/336 |
| 2009/0005120 | A1 * | 1/2009  | Ylitalo | 455/562.1 |
| 2009/0034448 | A1 | 2/2009  | Miller et al. | |
| 2010/0091675 | A1 * | 4/2010  | Sawai | 370/252 |
| 2011/0255434 | A1 * | 10/2011 | Ylitalo | 370/252 |

(Continued)

FOREIGN PATENT DOCUMENTS

| | | |
|---|---|---|
| EP | 2161855 | 3/2010 |
| KR | 10-2006-0125919 | 12/2006 |

(Continued)

*Primary Examiner* — Robert C Scheibel
(74) *Attorney, Agent, or Firm* — Staas & Halsey LLP

(57) ABSTRACT

A transmission apparatus and method for implementing frequency selectivity in a multi-beam satellite system that transmits a signal to user equipment through one or more antenna feed groups. The transmission apparatus includes: an antenna feed group selecting unit configured to select one or more antenna feed groups from the one or more antenna feed groups; a cyclic delay offset determining unit configured to determine a cyclic delay offset according to a determination result of the antenna feed group selecting unit; and a transmitting unit configured to apply the cyclic delay offset determined by the cyclic delay offset determining unit to a signal to be transmitted through the one or more antenna feed groups selected by the antenna feed group selecting unit, and to transmit a resultant signal.

17 Claims, 7 Drawing Sheets

(56) References Cited

U.S. PATENT DOCUMENTS

2012/0051284 A1* 3/2012 Chang .......................... 370/316
2012/0281672 A1* 11/2012 Ohm et al. .................... 370/331

FOREIGN PATENT DOCUMENTS

WO     WO 2005/091528     9/2005
WO     WO 2009050636 A2 *     4/2009

* cited by examiner

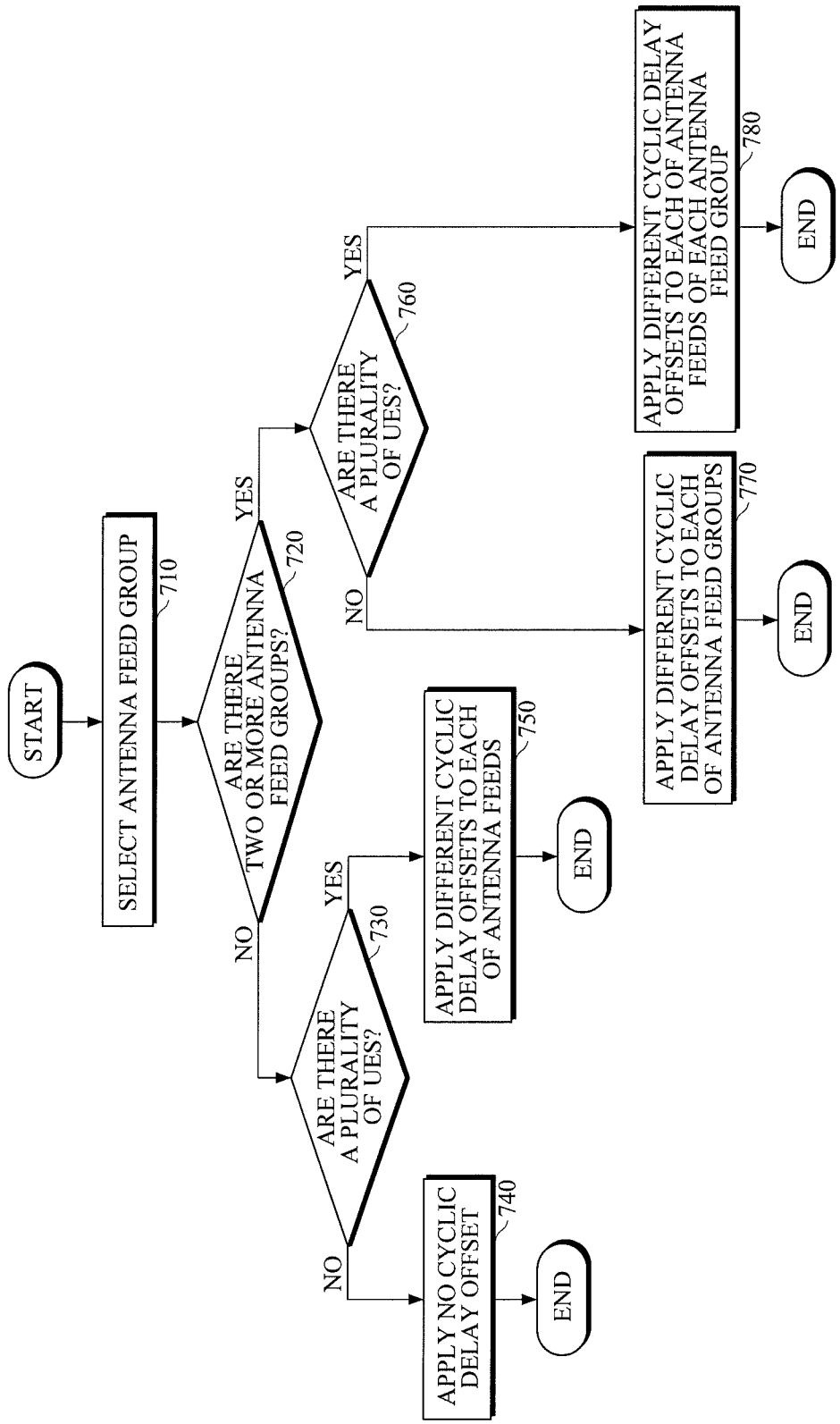

APPARATUS AND METHOD FOR PROVIDING FREQUENCY SELECTIVELY IN SATELLITE COMMUNICATION SYSTEM

CROSS-REFERENCE TO RELATED APPLICATION(S)

This application claims the benefit under 35 U.S.C. §119(a) of Korean Patent Application No. 10-2010-0131572, filed on Dec. 21, 2010, in the Korean Intellectual Property Office, the entire disclosure of which is incorporated herein by reference for all purposes.

BACKGROUND

1. Field

The following description relates to a satellite communication system, and more particularly, to a multi-beam based transmission apparatus and method using multi-carrier.

2. Description of the Related Art

As a satellite communication system in use of complementary terrestrial components (CTC), such as repeaters, complementary ground components (CGC), and ancillary terrestrial components (ATC), currently a satellite digital multimedia broadcasting (DMB) service is being provided in South Korea. In European countries, since around 2010 researches on Digital Video Broadcasting-Satellite services to Handhelds (DVB-SH) systems have been actively carried out. In addition, some of U.S. companies, such as MSV and Terrestar, have developed an integrated satellite-terrestrial system to provide voice and data communications in urban and rural areas using ATC.

The DMB system in South Korea has been designed to use a terrestrial network that uses the same channel gap filler with a satellite to thereby enable vehicles and fixed and mobile terminals to receive high-quality audio signals and multimedia signals. The DMB system is optimized to a frequency bandwidth in the range of 2630 to 2655 MHz of both satellite and terrestrial parts. The DMB system includes a feeder link earth station, a broadcasting satellite, two types of terrestrial repeaters, and a receiver, for example, a receiver for a vehicle, a fixed terminal, or a mobile terminal. At this time, for an uplink, a band (e.g., 14 GHz) for a fixed satellite service (FSS) is used. The satellite converts the received signal into a 2.6 GHz band signal, and the converted signal is amplified to have a predetermined magnitude by an amplifier in the repeater of the satellite and is broadcast to a terminal that is located in a service area.

It is required for the terminal to receive a signal transmitted from the satellite through a small antenna having low directivity. For this purpose, the terminal needs to have sufficient effective isotropic radiated power (EIRP). Thus, the satellite needs to have a large transmitting antenna and a high-power repeater. When the satellite transmits a 2.6 GHz band signal, a shadow problem occurs due to obstacles on a path from the satellite. In order to overcome this problem, at the time of designing a system, it is required to additionally provide a repeater that retransmits a satellite signal. The repeater allows the signal transmitted from the satellite to be transmitted to places where the signal cannot reach due to band obstacles, such as buildings. The repeater is divided into a direct amplification repeater and a frequency conversion repeater.

The direct amplification repeater only amplifies a 2.6 GHz band signal that is received from the satellite. The direct amplification repeater uses a low gain amplifier to prevent an unnecessary divergence from occurring due to signal interference between a receiving antenna and a transmitting antenna. The direct amplifier covers a small area at a distance of 500 m from the repeater on the basis of a line of sight (LoS). Meanwhile, the frequency conversion repeater covers a large area at a distance of 3 km from the repeater, and converts a 2.6 GHz band signal transmitted from the satellite into another frequency band (e.g., 11 GHz) signal and transmits the converted signal to the terminal. In an environment where the two types of repeaters are needed, multipath fading occurs when two or more signals are received by the terminal, and a rake receiver with CDM technology adopted is used to stably receive multipath fading signals.

As another example of the mobile satellite communication system, the DVB-SH system provides services to a terminal using a satellite for nationwide coverage, and services to the terminal using the CGC for an indoor environment and terrestrial coverage. The DVB-SH system provides a mobile TV service at a 15 MHz bandwidth of an S band on the basis of a DVB-H. In to this case, the DVB-SH system uses a band near to a band used for terrestrial international mobile telecommunication (IMT) of an S band. Accordingly, integration with the terrestrial IMT and network reuse with a terrestrial system is easy, which results in decreasing installation costs.

The DVB-SH system in European countries considers a hybrid broadcasting structure with the terrestrial system. In order to resolve a signal interference problem between the satellite and the CGC and efficiently use a frequency, the DVB-SH system considers a structure in which a reuse factor is set to 1 with respect to a CGC cell in one satellite spot beam and to 3 with respect to the satellite spot beam.

For example, in France, by using the satellite spot beam, 9 TV channels can be broadcast in nationwide coverage, and 27 channels can be broadcast through the terrestrial repeater in a downtown area or an indoor environment.

Finally, a geostationary orbit (GEO)-based mobile satellite communication system has been developed in Mobile Satellite Ventures (MSV) and Terrestar in U.S. in order to provide to a PCS/cellular-type terminal a ubiquitous wireless broadband communication service such as an Internet access service and a voice conversation service in L and S bands. The GEO-based mobile satellite communication system uses a hybrid wireless network structure where the satellite and the ATC are coupled to each other and provides voice or high-speed packet services through the ATC, that is, a terrestrial system in a downtown area or congested area, and services through the satellite in the country or areas outside the downtown that are not covered by the ATC in U.S. or Canada. Since the ATC uses a wireless interface such as the satellite, the GEO-based mobile satellite communication system has been developed such that satellite services can be provided without increasing complexity of the terminal.

All personal portable mobile satellite communication systems that will be developed use a satellite in the country or areas outside the downtown where a line of sight is secured are scheduled to provide services using a complementary terrestrial component, and using the complementary terrestrial component in the downtown area or an indoor environment where satellite signals are not secured.

Recently, orthogonal frequency division multiplexing (OFDM) and orthogonal frequency division multiple access (OFDMA) technologies have been researched as an effective method of is high-speed data transmission over wired/wireless channels in the $4^{th}$ generation terrestrial mobile communication system. The OFDM technology uses multi-carriers to transmit data. In the OFDM technology, a serially input symbol row is converted into a parallel data streams. Then, each of the parallel data streams is modulated with multiple orthogonal sub-carriers, that is, with multiple sub-carrier channels, and then transmitted. OFDM is similar to conventional frequency-division multiplexing. However, OFDM is characterized in transmitting data while maintaining orthogonality between multiple sub-carriers, and thereby achieving optimal transfer efficiency in high-speed data transmission. In addition, OFDM has enhanced frequency utilization efficiency and is robust against multipath fading, and thus can realize optimal transfer efficiency in high-speed data transmission. Furthermore, since frequency spectrum can be used in an overlapping manner, more efficient frequency utilization can be achieved and OFDM can be robust against frequency-selective fading and multipath fading, as well as impulsive noise. Also, it is possible to reduce interference between symbols using a guard interval, and to achieve an equalizer with a simple hardware design. Due to the above characteristics, OFDM has been actively utilized in a terrestrial communication system. OFDMA is an OFDM-based multiple access scheme. OFDMA enables a plurality of users, that is, a plurality of terminals, to divide and use sub-carriers in one OFDM symbol, and divides frequency and time and allocates the divided frequency and time to each user.

OFDMA is advantageous in that it can provide frequency and time in various ways according to user's demand. Thus, OFDMA can provide a variety of quality of service. In addition, OFDMA adaptively allocates sub-channels of OFDM according to user's channel environment, and thus can maximize capacity and can be used simultaneously with TDMA.

To reduce chipset cost of a terminal, it is important for a satellite interface and a terrestrial interface to have commonality. However, long propagation delay and large spot beam coverage which are characteristics of the satellite require a wireless interface on the earth to be modified for the satellite to reuse. Thus, a technology for overcoming long propagation delay and a method for reusing a frequency to maximize frequency efficiency have been introduced to apply OFDM or OFDMA in the satellite environment.

However, the suggested technologies and methods are characterized in that, unlike a terrestrial system, a satellite channel of LOS does not experience multipath fading and channels for different users have similar characteristics. Hence, the satellite environment cannot fully utilize the advantages of OFDM or OFDMA scheme of the terrestrial system.

SUMMARY

The following description relates to an apparatus and method for differentiating characteristics of channel fading among multi-carrier signals transmitted for multiple users over one beam in a multi-carrier based satellite communication system.

The present invention relates to an apparatus and method for obtaining a multi-user diversity gain by differentiating characteristics of channel fading among signals transmitted for one user over multiple beams in a multi-carrier based satellite communication system.

In one general aspect, there is provided a transmission apparatus for implementing frequency selectivity in a multi-beam satellite apparatus that transmits a signal to user equipment (UE) through one or more antenna feed groups, the transmission apparatus including: an antenna feed group selecting unit configured to select one or more antenna feed groups from the one or more antenna feed groups; a cyclic delay offset determining unit configured to determine a cyclic delay offset according to a determination result of the antenna feed group selecting unit; and a transmitting unit configured to apply the cyclic delay offset determined by the cyclic delay offset determining unit to a signal to be transmitted through the one or more antenna feed groups selected by the antenna feed group selecting unit, and to transmit a resultant signal.

In another general aspect, there is provided a transmission method for implementing frequency selectivity in a multi-beam satellite communication system, the transmission method including: selecting an antenna feed group; determining a cyclic delay offset according to the number of the selected antenna feed groups and the number of pieces of user equipment (UE); and applying the determined cyclic delay offset to a signal and transmitting a resultant signal through the selected antenna feed group.

Other features and aspects may be apparent from the following detailed description, the drawings, and the claims.

BRIEF DESCRIPTION OF THE DRAWINGS

FIG. 7 is a flowchart illustrating an example of a transmission method for implementing frequency-selectivity in a satellite communication system according to an exemplary embodiment of the present invention.

Figure 1:
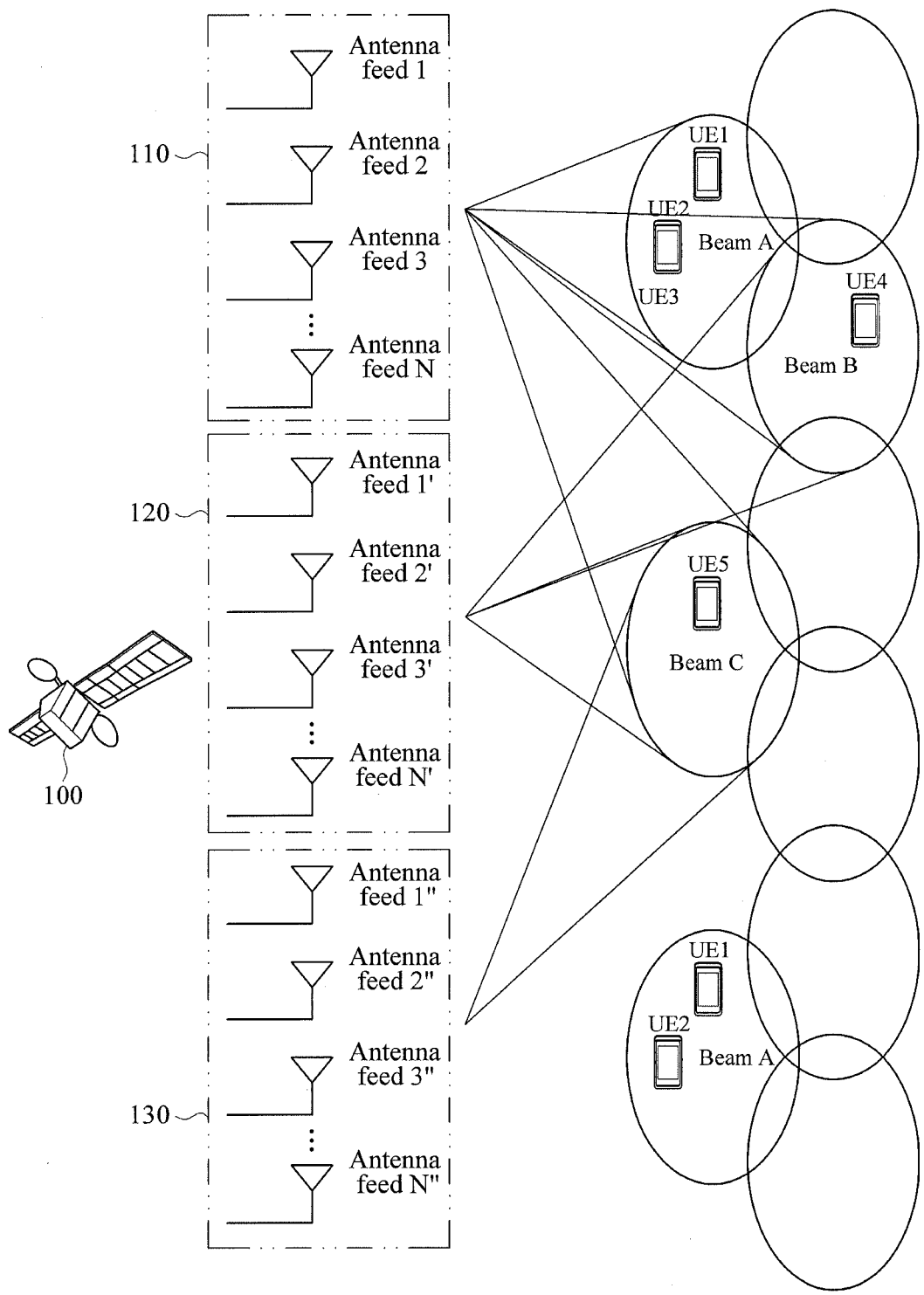
FIG. 1 is a diagram illustrating an example of a multi-beam satellite communication system according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The present invention provides an apparatus and method for obtaining a diversity gain by applying different cyclic delay offset values to a number of user signals to be transmitted over one beam or to signals transmitted for one user over a number of beams in an orthogonal frequency division multiplexing (OFDM) or orthogonal frequency division multiple access (OFDMA) multi-beam satellite system.

According to the present invention, while maintaining commonality with an existing OFDM based terrestrial wireless interface, users are assigned different channel characteristics as in a terrestrial system, and OFDM sub-channels are allocated adaptively to each user's channel environment, so that system capacity can be maximized. The present invention is applicable to a multi-carrier based multi-beam satellite communication system that includes OFDM or OFDMA. In addition, the present invention is applicable to a satellite communication system in a low frequency band, such as L or S band, or in a high frequency band, such as Ka or Ku band. Furthermore, the present invention is applicable to a fixed or mobile terminal or a broadcast satellite communication system.

FIG. 1 is a diagram illustrating an example of a multi-beam satellite communication system according to an exemplary embodiment of the present invention.

Referring to FIG. 1, multi-beam satellite communication system may include a satellite apparatus 100 including a plurality of antenna feed groups 110, 120, and 130, and a plurality of pieces of user equipment UE, each receiving a signal from the satellite apparatus 110. A plurality of the antenna feed groups 110, 120, and 130 include a first antenna feed group 110, a second antenna feed group 120, and a third antenna feed group 130, and each of the first to third antenna feed groups includes first to n-th antenna feeds. Although the example illustrated in FIG. 1 shows only three antenna feed groups for the purpose of explanation, the number of antenna feed groups is not limited thereto. Thus, the satellite apparatus 100 may include three or more antenna feed groups.

Each of the antenna feed groups 110, 120, and 130 may be used to form a specific beam. For example, referring to FIG. 1, beam A is formed by the first antenna feed group 110. In addition, one beam may be formed by two or more antenna groups. For example, beam B may be formed by the first antenna feed group 110 and the second antenna feed group 120, and beam C may be formed by the first to third antenna feed groups 110, 120, and 130.

In access by the user equipment (UE) to the satellite apparatus 100 over each beam, there may be two ways of accessing.

First, two or more UEs access the satellite apparatus over a beam generated by one antenna group. For example, UE1, UE2, and UE3 shown in FIG. 1 simultaneously access the satellite apparatus through a sub-carrier channel of OFDMA allocated from beam A generated by the first antenna feed group.

Second, one UE accesses the satellite apparatus over multiple beams generated by a number of antenna groups. For example, UE4 shown in FIG. 1 receives a signal from beam B which is generated by the first antenna feed group 110 and the second antenna feed group 120. In addition, UE5 receives a signal from beam C generated by the first to third antenna feed groups 110, 120, and 130. UE4 and UE5 may receive a signal with a high SNR from the beams generated by a plurality of antenna groups.

However, in an OFDM or OFDMA satellite communication system, most signals between a satellite apparatus and UEs form line of sight (LOS). Thus, it may be possible to increase a reception SNR of signals generated by a plurality of antenna feed groups, but not possible to obtain a reception diversity gain. In addition, since UEs present in a beam have similar channel characteristics and thus it is not possible to allocate adaptively sub-carrier channels to the UEs according to frequency-selective channel characteristics, there is a limitation in increase of system capacity.

Thus, the present invention provides a reception apparatus and method for increasing system capacity of a satellite communication system by applying a cyclic delay offset to artificially change a channel characteristic to be frequency-selective.

Figure 2:
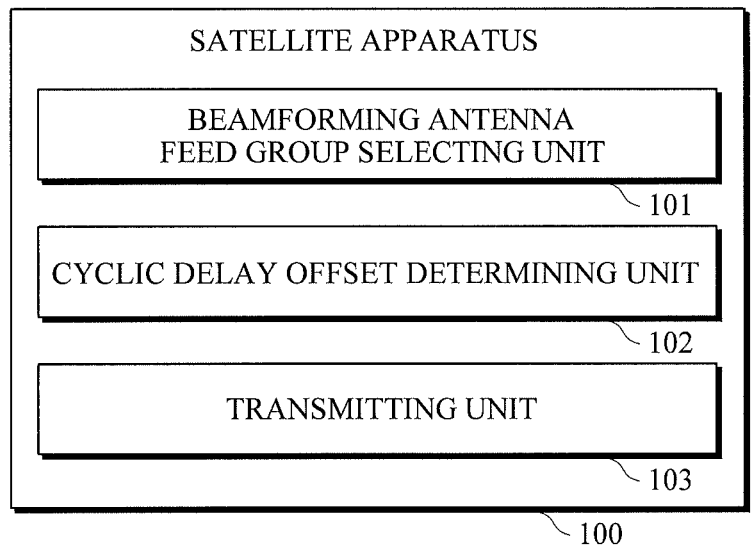
FIG. 2 is a diagram illustrating an example of a configuration of a satellite apparatus according to an exemplary embodiment of the present invention.

FIG. 2 is a diagram illustrating an example of a configuration of a satellite apparatus according to an exemplary embodiment of the present invention.

Referring to FIG. 2, satellite apparatus 100 may transmit information to two or more pieces of user equipment (UE) through a forward link channel. In addition, the satellite apparatus 100 may receive information from the two or more UEs through a backward link channel. The satellite system may operate in an OFDMA wireless network.

In one example, the satellite apparatus 100 may include a beamforming antenna feed group selecting unit 101, a cyclic delay offset determining unit 102, and a transmitting unit 103.

The beam forming antenna feed group selecting unit 101 may select one or more from a plurality of antenna feed groups 110, 120, and 130 included in the satellite apparatus 100 (refer to FIG. 1), and then output a selection result signal to the cyclic delay offset determining unit 102 and the transmitting unit 103.

The cyclic delay offset determining unit 102 may determine a cyclic delay offset according to the selection result signal from the antenna feed group selecting unit 101, and output the determined cyclic delay offset to the transmitting unit 103.

There may be two ways of determining a cyclic delay offset.

First, if multiple UEs are present in one beam, a cyclic delay offset is applied to differentiate channel characteristics among the multiple UEs. For example, the channel characteristics of UE1, UE2, and UE3 are differentiated from one another and sub-carriers are adaptively allocated to UEs, thereby increasing system capacity.

Second, in the case of UEs that receive multiple beams generated by a plurality of antenna groups, a cyclic delay offset is applied among the multiple beams generated by a plurality of the antenna groups. For example, a cyclic delay offset is applied among multiple beams generated by a plurality of the antenna groups such as UE4 and UE5 so that a diversity gain between beam signals generated by the antenna groups can be obtained.

In addition, the cyclic delay offset determining unit 102 may determine a cyclic delay offset applicable to each selected antenna feed group, and output the determined cyclic delay offset to the transmitting unit 103.

The transmitting unit 103 may apply the cyclic delay offset received from the cyclic delay offset determining unit 102 in transmitting a beam formed from a signal through the antenna feed group selected by the beamforming antenna feed group selecting unit 101.

In addition, the transmitting unit 103 may be implemented in two ways as follows.

<First Embodiment>

Figure 3:
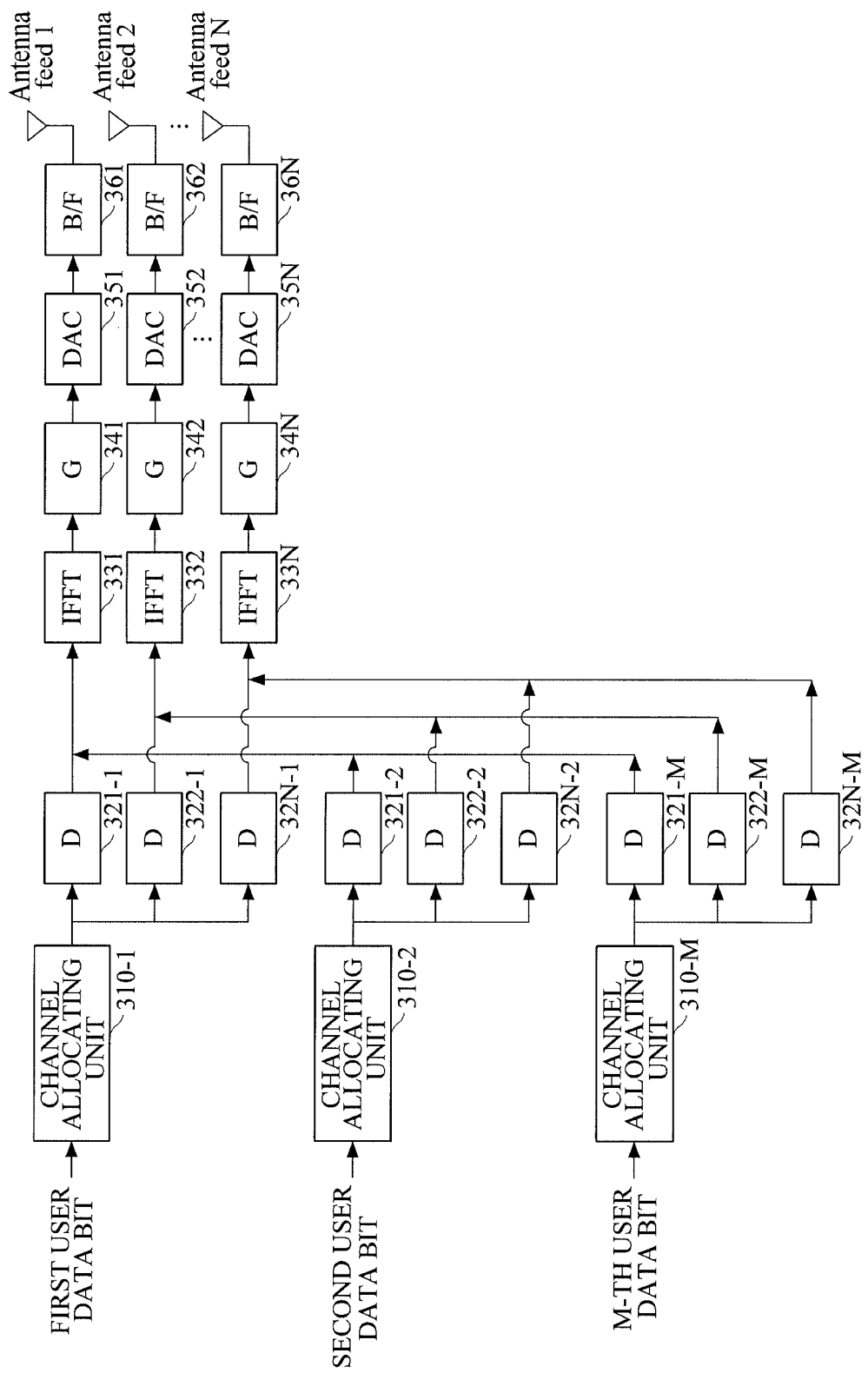
FIG. 3 is a diagram illustrating an example of a configuration of a transmitting unit according to a first embodiment of the present invention.

FIG. 3 is a diagram illustrating an example of a configuration of a transmitting unit according to a first embodiment of the present invention.

Referring to FIG. 3, transmitting unit 103 may have a configuration that applies a cyclic delay offset to generate frequency-selective fading among a number of UEs present in one beam generated by one antenna feed group. However, since the UEs present in one beam generally communicate with a satellite through line of sight (LOS), channel characteristics between the satellite apparatus and each of the UEs may be frequency flat. Thus, reception signals of most UEs have no frequency-selective characteristics, and hence it is not possible to obtain a multiple-user diversity gain which can be achieved in an OFDM-based terrestrial system. In the first embodiment, the transmitting unit 103 applies a different cyclic delay offset to each of signals to be transmitted to UEs so as to obtain a multiple-user diversity gain. Although FIG. 3 illustrates that the cyclic delay offset is applied subsequent to channel allocation, the cyclic delay offset may be applied prior to the channel allocation.

Referring to FIG. 3, channel allocating units 310-1, 310-2, and 310-M allocate channels for transmitting signals to each of UEs. In this case, in consideration of a frequency-selective characteristic which may result from a cyclic delay offset D applied to each user, a sub-carrier channel that has the best channel characteristics may be allocated. As a result, a multiple-user diversity gain may be achieved. In addition, since the channels are allocated from the entire sub-carrier channels, a frequency diversity gain may be achieved.

Cyclic delay offsets D 321-1, 322-1, . . . , 32N-1, 321-2, 322-2, . . . , 32N-2, . . . , 321-M, 322-M, and 32N-M may apply a different cyclic delay offset value to each of antenna feed signals to be transmitted to UEs so as to artificially make the channel characteristic between each multi-beam signal and each UE to be frequency-selective. That is, a value to be applied to antenna feed 1 may be different from a value to be applied to another antenna feed. In addition, to enable the UEs to have different frequency-selective characteristics, different cyclic delay offset values may be applied to the UEs.

Inverse fast Fourier transform (IFFT) units 331, 332, and 33N may perform IFFT on a signal output from each of the cyclic delay offsets D, and output the resultant signal. Guard interval inserters G 341, 342, and 34N may insert a guard interval into the signal output from each of the IFFT units 331, 332, and 33N, and output the signal into which the guard interval has been inserted to each of digital analog converters (DACs) 351, 352, and 35N. Here, the guard interval is inserted to prevent interference between a current OFDM symbol to be transmitted at the present OFDM symbol time and a previous OFDM symbol transmitted at a previous OFDM symbol time in an OFDMA communication system. The guard interval may be in the form of a cyclic prefix or a cyclic postfix.

The DACs 351, 352, and 35N may convert a signal output from each of the guard interval inserters 341, 342, and 34N into an analog signal and output the analog signal. Then, beamforming (B/F) units 361, 362, and 36N may form a signal output from each of the DACs 684, 352, and 35N into a beam, and output the formed beam to corresponding each of antenna feeds 1 to N. In this case, the beam forming unit 361 may transmit a signal through antenna feed 1, the beam forming unit 362 may transmit a signal through antenna feed 2, and the beam forming unit 36N may transmit a signal through antenna feed N.

Figure 4:
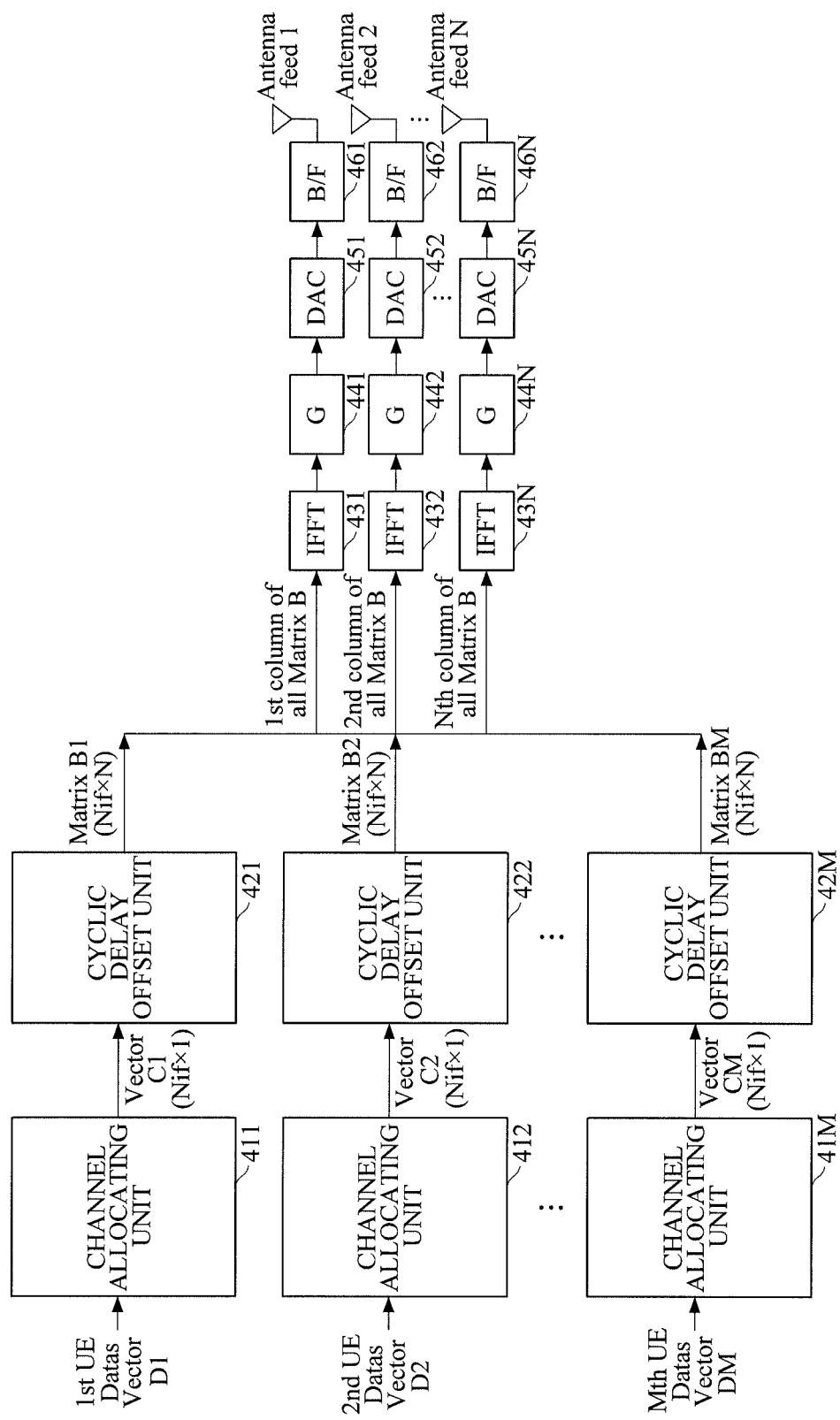
FIG. 4 is a diagram illustrating another example of a configuration of a transmitting unit according to the first exemplary embodiment of the present invention.

FIG. 4 is a diagram illustrating another example of a configuration of a transmitting unit according to the first exemplary embodiment of the present invention.

Referring to FIG. 4, transmitting unit has the same elements as the transmitting unit shown in the example illustrated in FIG. 3 other than channel allocating units 411, 412, . . . , and 41M, cyclic delay offset units 421, 422, . . . , and 42M, and beamforming units 461, 462, and 463, and thus the detailed description of the same elements will not be reiterated.

The example illustrated in FIG. 4 assumes that M UEs simultaneously access a satellite apparatus. A data vector consisting of data to be transmitted from each UE has a size of Di (i=1, 2, N). The channel allocating units 411, 412, . . . , and, 41M may receive Di data vector to be transmitted to each UE, multiply the Di data vector by channel allocation matrix Rci, and output the resultant value. The channel allocation matrix Rci is a matrix to indicate a sub-carrier position at which the i-th user is allocated, and is a diagonal matrix. Each element value of a diagonal matrix is either '0' or '1,' and when i-th user data is allocated to a sub-carrier that is equivalent to each element of the diagonal matrix, the sub-carrier has a value of '1', otherwise, the sub-carrier has a value of '0'. Thus, the number of '1's in the matrix Rci is the same as the size of each UE data vector Di, and arbitrary $RiRi'^T=0$ so as to orthogonally allocate a resource to each UE. In UE data mapping in the channel allocation matrix, element values of UE vector Di are sequentially allocated to elements of the matrix having a value of '1,' thereby forming vector Ci. That is, if a value of (k, k) in the channel allocation matrix is '0,' a value of (k×1) of vector Ci is '0'. If a value of (k', k') in the channel allocation matrix is '1,' a value of C (k'×1) may be mapped sequentially by element values of Di vector. The cyclic delay offset units 421, 422, . . . , 42M may apply a cyclic delay offset from the cyclic delay offset vector Ri to is the vector Ci calculated by each of the channel allocating units 411, 412, . . . , and, 41M. Each cyclic delay offset vector value may be calculated by Equation 1 as below.

$$Ri = [1 \exp(-j2\pi\tau i) \exp(-j2\pi\tau i 2) \exp(-j2\pi\tau i 3) \ldots \exp(-j2\pi\tau i(N-1))] \quad (1)$$

Bi having a size of Nif×N is generated from CiRi, and each row of Bi is transmitted to a corresponding antenna feed. That is, in antenna feed 1, the sum of the first rows of B1, B2, . . . , and, BM is provided to the IFFT unit as an input. Each antenna feed is configured to transmit a signal, to which the cyclic delay offset delay has been applied, through a beamforming unit. In the embodiment, the order of the aforementioned operations may be changed or combined with one another.

<Second Embodiment>

In the second embodiment, a signal is transmitted to one terminal over two or more beams generated by a plurality of antenna feed groups. That is, in a case in which a signal is received over two or more beams generated by a plurality of antenna feed groups such as UE4 and UE5 as shown in FIG. 1, the second embodiment provides a method of increasing an SNR of a reception signal and simultaneously applying a cyclic delay offset to the signal in order to achieve a diversity gain.

Referring back to FIG. 1, since a communication between most multi-beam signals for UEs is established through LOS, channel characteristics between each beam and each UE are generally frequency flat. Thus, since the reception signal from the multiple beams does not have a frequency selective characteristic, it is not possible to achieve a frequency diversity gain, which can be obtained in an OFDMA-based terrestrial system.

Accordingly, according to the exemplary embodiments, the transmitting unit 103 applies different cyclic delay offsets to multi-beam signals to generate frequency selective fading between beam signals. There may be two embodiments of the transmitting unit 103 according to which domain the cyclic delay offset is applied to, a frequency domain or a time domain.

Figure 5:
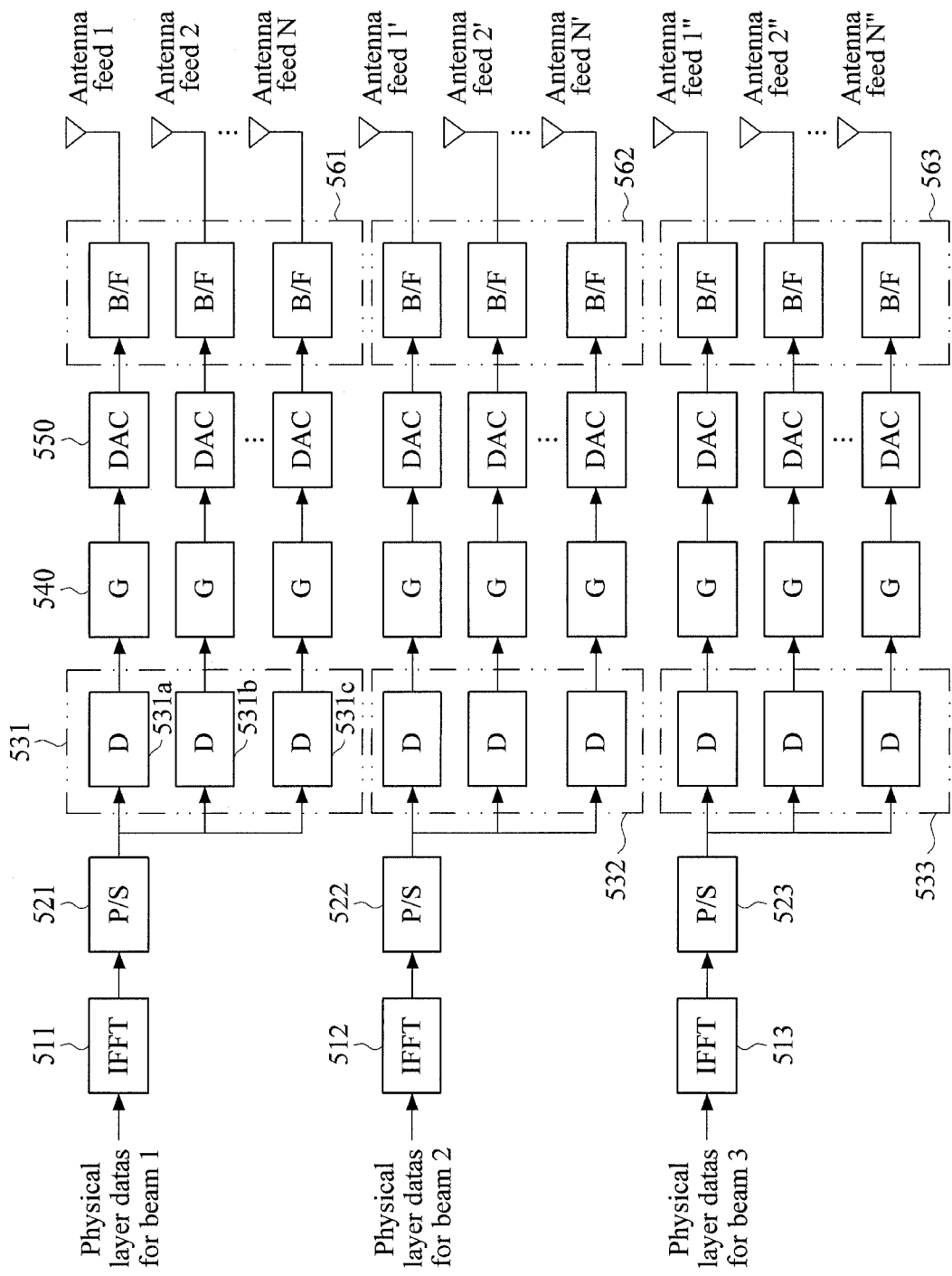
FIG. 5 is a diagram illustrating an example of a configuration of a transmitting unit that applies a cyclic delay offset to a time domain according to the second exemplary embodiment of the present invention.

FIG. 5 is a diagram illustrating an example of a configuration of a transmitting unit that applies a cyclic delay offset to a time domain according to the second exemplary embodiment of the present invention.

Referring to FIG. 5, IFFT units 511, 512, and 513 may perform IFFT on physical layer data of each of incoming multiple beams, and output the resultant data to corresponding parallel-to-serial converters (P/S) 521, 522, and 523.

The parallel-to-serial converters 521, 522, and 523 may perform serial-conversion on the multi-beam signals output from the respective IFFT units 511, 512, and 513, and output the converted signals. Cyclic delay offset units 531, 532, and 533 may apply different cyclic delay offsets to antenna feed signals for the multiple beams to artificially make channel characteristics between each of the multi-beam signals and each UE frequency selective. A cyclic delay offset of $\tau_1$ is applied to first cyclic delay offset units 531 that generate beam 1, a cyclic delay offset of $\tau_2$ is applied to second cyclic delay offset units 532 that generate beam 2, and a cyclic delay offset of $\tau_3$ is applied to third cyclic delay offset units 533 that generate beam 3.

A guard interval inserter (G) 540 may insert a guard interval into each of signals output from the cyclic delay offset units 531, 532, and 533, and output the resultant signals to a digital analog converter (DAC) 550. Here, the guard interval is inserted to prevent interference between a current OFDM symbol to be transmitted at the present OFDM symbol time and a previous OFDM symbol transmitted at a previous OFDM symbol time in an OFDMA communication system. The guard interval may be in the form of a cyclic prefix or a cyclic postfix. The DAC 550 may convert the signal output from the guard interval inserter 540 into an analog signal. Thereafter, a beamforming (B/F) unit 560 may form the signal output from the DAC 550 into a beam and output the formed beam to each of a plurality of antenna feed groups. For example, first beamforming units 561 transmit beam 1 through a first antenna feed group to UE. Second beamforming units 562 transmit beam 2 to a second antenna feed group. Third beamforming units 563 transmit beam 3 to a third antenna feed group.

Figure 6:
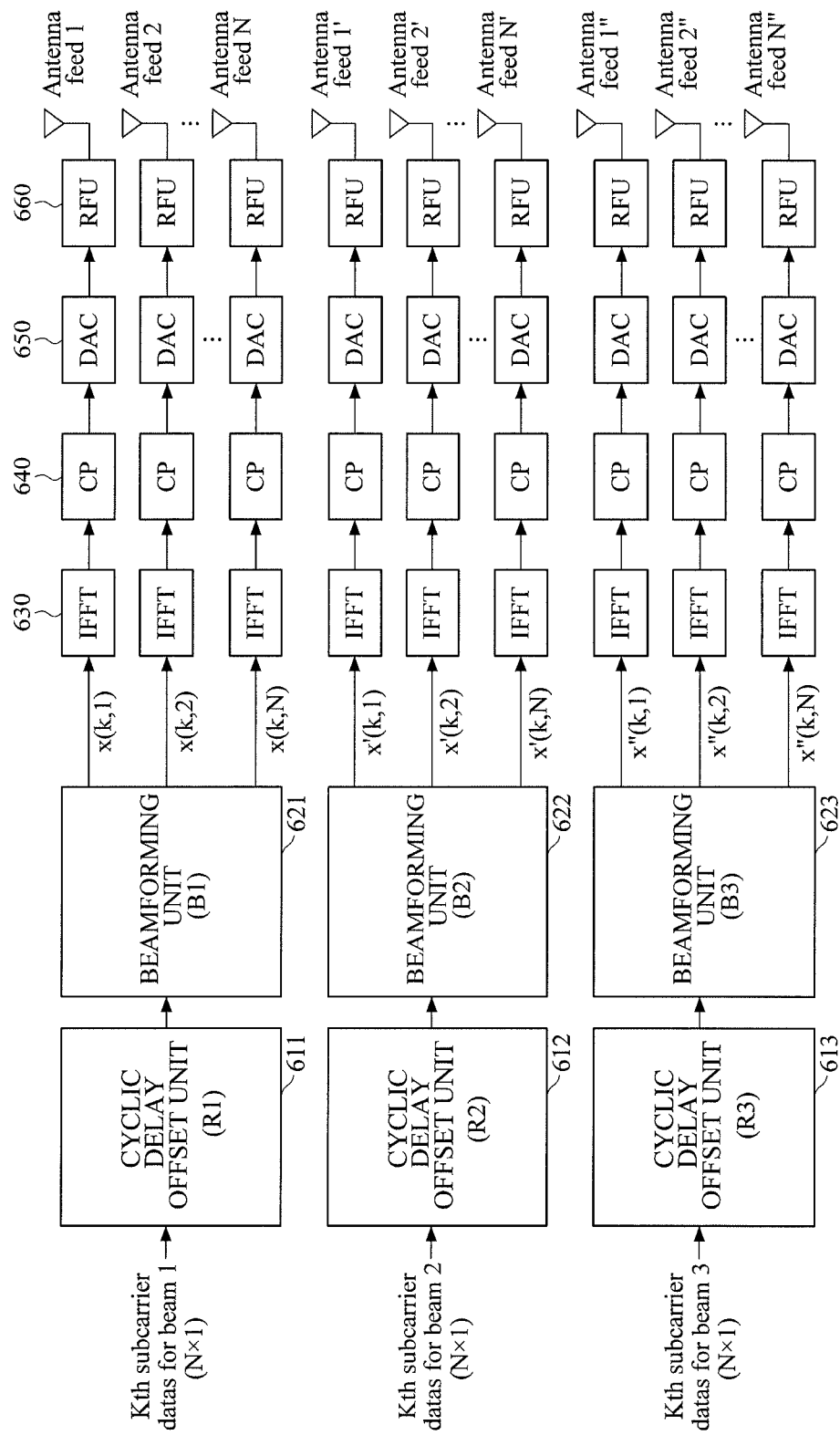
FIG. 6 is a diagram illustrating another example of a configuration of a transmitting unit that applies a cyclic delay offset to a frequency domain according to the second exemplary embodiment.

FIG. 6 is a diagram illustrating another example of a configuration of a transmitting unit that applies a cyclic delay offset to a frequency domain according to the second exemplary embodiment.

Referring to FIG. 6, cyclic delay offset units 611, 612, and 613 and beamforming units 621, 622, and 623 are positioned before IFFT units 630. Hereinafter, operation of all elements other than the cyclic delay offset units 611, 612, and 613 and the beamforming units 621, 622, and 623 in the transmitting unit in FIG. 6 are the same as those in the transmitting unit illustrated in FIG. 5, and thus the detailed description thereof will not be reiterated.

The k-th sub-carrier data vector for use in forming multiple beams for one UE is input from a transmitting unit 413. The cyclic delay offset units 611, 612, and 613 may apply a cyclic delay offset matrix Ri (i=1, 2, 3), which is a diagonal matrix, to data signals transmitted over the k-th sub-carrier of each beam. For example, a cyclic delay offset matrix R1 may be a diagonal matrix represented by Equation 2 as below:

$$R1 = \begin{bmatrix} 1 & \cdots & 0 \\ \vdots & \ddots & \vdots \\ 0 & \cdots & e^{-j2\pi\tau_1(N-1)k} \end{bmatrix} \quad (2)$$

The beamforming units 621, 622, and 623 may multiple data output from the cyclic delay offset units 611, 612, and 613 by a beam forming matrix B1 to form a target beam. The k-th sub-carrier signals from each of beams 1, 2, and 3 output from the respective beamforming units 621, 622, and 623 may be mapped to positions of the k-th sub-carriers by the IFFT units 630, and then the mapped signals are transmitted independently to each antenna. Thus, a signal x(k) for each of antenna feed groups, which has been applied a cyclic delay offset and a digital beam forming algorithm, may be mapped to the k-th sub-carrier signal for IFFT on each of antenna feed elements that constitute the antenna groups for beamforming, and the mapped signal undergoes processing and RF processing, and then transmitted.

Hereinafter, a diversity transmission method in the aforementioned satellite communication system will be described.

FIG. 7 is a flowchart illustrating an example of a transmission method for implementing frequency-selectivity in a satellite communication system according to an exemplary embodiment of the present invention.

Referring to FIG. 7, at 710, satellite apparatus selects an antenna feed group for use. At 720, it is determined whether there are two or more selected antenna feed groups.

In response to a determination at 720 that two or more antenna feed groups have been selected, the satellite apparatus determines whether there are a plurality of UEs present at 730. In response to a determination at 730 that there is one UE present, the satellite apparatus generates, at 740, a beam and transmits the beam through a transmitting unit without applying a cyclic delay offset. That is, in a case in which a signal is transmitted to one UE over a beam formed by one antenna feed group, a cyclic delay offset is not applied to the signal.

In response to a determination at 730 that there are a plurality of UEs, the satellite apparatus applies different cyclic delay offsets to each of antenna feeds at 750, and transmits signals to the UEs. That is, as shown in the example illustrated in FIG. 3 or 4, in a case in which data signals for a plurality of UEs are transmitted through a plurality of antenna feeds belonging to the same antenna feed group, the signals transmitted through the respective antenna feeds are applied different cyclic delay offsets.

Referring back to FIG. 7, in response to a determination at 720 that there are two or more selected antenna feed groups, the satellite apparatus determines whether there are a plurality of UEs present at 760.

In response to a determination at 760 that there is one UE, the satellite apparatus applies different cyclic delay offsets to each of antenna feed groups at 770. That is, as shown in the example illustrated in FIG. 5 or 6, in a case in which data signals for one UE are transmitted through a plurality of antenna feed groups, the data signal transmitted through the respective antenna feed groups are applied different cyclic delay offsets.

On the other hand, in response to a determination at 760 that there are a plurality of UEs, the satellite apparatus applies different cyclic delay offsets to each of antenna feeds of each of antenna feed groups at 780. That is, if data signals for a plurality of UEs are transmitted through a plurality of antenna feed groups, signals to be transmitted through the respective antenna feeds belonging to each of the antenna feed groups are applied different cyclic delay offsets.

Accordingly, in a multi-carrier-based satellite communication system, channel fading characteristics experienced by multi-carrier signals transmitted over one beam for multiple users are set different from one another, thereby obtaining a diversity gain.

In a multi-carrier-based satellite communication system, channel fading characteristics experienced by signals transmitted over multiple beams for one user are set to be different for each beam, thereby obtaining a diversity gain.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus implementing frequency selectivity in a multibeam satellite apparatus that transmits a signal to a user equipment (UE) through one or more antenna feed groups, the transmission apparatus comprising:
at least one processor configured to:
calculate one or more cyclic delay offset values to correspond with beam signal formation of a selected one or more antenna feed groups indicated by a selection signal, the one or more cyclic delay offset values being adaptively calculated by determining presence of one of a user equipment (UE) in a multi-beam signal and multiple UEs other than the UE in a beam signal in accordance with the beam signal formation of the selected one or more antenna feed groups;
wherein each antenna feed group comprises a plurality of antenna feeds;
wherein when the presence of the UE in a multi-beam signal is determined, the adaptively calculating comprises calculating a different cyclic delay offset value for each of the one or more antenna feed groups;
wherein when the presence of the multiple UEs in a beam signal is determined, the adaptively calculating comprises calculating a different cyclic delay offset value for each antenna feed of each of the one or more antenna feed groups;
and apply the cyclic delay offset value to a signal to be transmitted through the selected one or more antenna feed groups, and transmit a resultant signal.

2. The apparatus of claim 1, wherein the signal is transmitted through an orthogonal frequency division multiple access (OFDMA) wireless interface.

3. The apparatus of claim 1, comprising:
determining whether there are two or more UEs to which the signal is to be transmitted through the selected one or more antenna feed groups, and determining a different cyclic delay offset value according to a result of the determining.

4. The apparatus of claim 1, wherein when determining a signal is transmitted to a plurality of UEs through one antenna feed group, the cyclic delay offset value is calculated in such a manner to differentiate channel characteristics between the UEs and output the cyclic delay offset value.

5. The apparatus of claim 1, comprising:
a channel allocation unit configured to allocate a channel to transmit a signal to each of a plurality of UE,
a plurality of cyclic delay offset units configured to apply different cyclic delay offsets to signals to be transmitted through all antenna feeds and output resultant signals,
a plurality of inverse fast Fourier transform (IFFT) units configured to receive a plurality of physical layer data bits to be formed into multiple beams, perform IFFT on the received data bits, and output resultant signals,
a plurality of guard interval inserters, each being configured to insert a guard interval into each of a plurality of the signals output from the IFFT units,
a plurality of digital-to-analog converters (DACs), each being configured to convert the signal from each of a plurality of the guard interval inserter to an analog signal, and
a plurality of beamforming units, each being configured to form the signal output from each of a plurality of the DACs into a beam and transmit the beam through an antenna.

6. The apparatus of claim 5, wherein the channel allocation unit is further configured to receive a data vector to be transmitted to a plurality of the UEs, multiply the data vector by a channel allocation matrix which is a diagonal matrix indicating sub-carrier positions, at each of which each UE is allocated, and output a resultant data vector, and the cyclic delay offset units are configured to apply a cyclic delay offset vector to the data vector output from the channel allocation unit.

7. The apparatus of claim 1, wherein the cyclic delay offset value is applied between multiple beams generated by a plurality of antenna groups and enables the beams having the cyclic delay offset value applied thereto to be output from the antenna groups.

8. The apparatus of claim 7, wherein the cyclic delay offset value is applied to a time domain.

9. The apparatus of claim 7, wherein the cyclic delay offset value is applied to a frequency domain.

10. The apparatus of claim 7, comprising:
a plurality of IFFT units to receive a plurality of physical layer data bits to be formed into multiple beams, perform IFFT on the received data bits, and output resultant signals,
a plurality of parallel-to-serial converters configured to convert parallel signals output from the IFFT units into series signals,
a plurality of cyclic delay offset units configured to apply different cyclic delay offsets to a plurality of signals output from the parallel-to-serial converters and output resultant signals,
a plurality of guard interval inserters, each being configured to insert a guard interval into each of a plurality of signals output from the cyclic delay offset units,
a plurality of digital-to-analog converters, each being configured to convert each of signals output from the guard interval inverters into an analog signal and output the analog signal, and
a plurality of beamforming units, each being configured to form the signals output from the digital-to-analog converters into a beam and transmit the formed beam through a plurality of the antenna feed groups.

11. The apparatus of claim 10, wherein each of the plurality of the cyclic delay offset units is further configured to include a plurality of cyclic delay offset elements which, respectively, correspond to a plurality of antenna feeds belonging to each of the antenna feed groups.

12. The apparatus of claim 7, comprising:
a plurality of cyclic delay offset units, each being configured to, in response to a sub-carrier data vector to be formed into multiple beams being input, multiply the data vector by a cyclic delay offset matrix which differs according to each beam and output the multiplied data vector,
a plurality of beamforming units, each being configured to multiply a signal output from each of the cyclic delay offset units by a beamforming matrix and output a resultant signal,
an IFFT unit configured to map a beam signal produced by each of the beamforming units to a sub-carrier position and output the mapped signal,
a guard interval inserter configured to insert a guard interval into the signal output from the IFFT unit, a digital-to-analog converter configured to convert a signal output from the guard interval inserter into an analog signal, and a wireless processing unit configured to perform wireless processing on a signal output from the digital-to-analog converter and output the signal through a plurality of the antenna feed groups.

13. The apparatus of claim 12, wherein the cyclic delay offset matrix is a diagonal matrix in which numbers of rows and columns are a number of beams to be formed.

14. A transmission method implementing frequency selectivity in a multi-beam satellite communication system, the transmission method comprising:

selecting one or more antenna feed groups;

calculating one or more cyclic delay offset values to correspond with beam signal formation indicated by the one or more selected antenna feed groups, the cyclic delay offset value being adaptively calculated by determining presence of one of a number of pieces of user equipment (UE) in a beam signal and a single UE in a multi-beam signal in accordance with the beam signal formation of the selected one or more antenna feed groups; and wherein each antenna feed group comprises a plurality of antenna feeds;

wherein when the presence of the UE in a multi-beam signal is determined, the adaptively calculating comprises calculating a different cyclic delay offset value for each of the one or more antenna feed groups;

wherein when the presence of the multiple UEs in a beam signal is determined, the adaptively calculating comprises calculating a different cyclic delay offset value for each antenna feed of each of the one or more antenna feed groups;

applying the one or more cyclic delay offset values to a signal and transmitting a resultant signal through the selected one or more antenna feed groups.

15. The transmission method of claim 14, wherein the calculating of the cyclic delay offset comprises:

determining different cyclic delay offsets to be applied to each of antenna feeds belonging to the antenna feed group if there is one antenna feed group and there are a plurality of UEs present.

16. The transmission method of claim 14, wherein the calculating of the cyclic delay offset comprises:

determining different cyclic delay offset to be applied to each of the antenna feed groups if there are two or more selected antenna feed groups and there is one UE present.

17. The transmission method of claim 14, wherein the calculating of the cyclic delay offset comprises:

determining different cyclic delay offsets to be applied to each of antenna feeds of each of the antenna feed groups if there are two or more selected antenna feed groups and there are two or more UEs.

* * * * *